(12) United States Patent
Long et al.

(10) Patent No.: US 6,193,793 B1
(45) Date of Patent: Feb. 27, 2001

(54) ASPHALTIC COMPOSITIONS AND USES THEREFOR

(76) Inventors: Howard W. Long, deceased, late of Fountain Inn, SC (US); by Genevieve E. Long, executrix, 115 Allison Dr., Fountain Inn, SC (US) 29644-9300

(*) Notice: Subject to any disclaimer, the term of this patent is extended or adjusted under 35 U.S.C. 154(b) by 0 days.

(21) Appl. No.: 08/462,814

(22) Filed: Jun. 5, 1995

Related U.S. Application Data

(63) Continuation-in-part of application No. 07/655,675, filed on Feb. 14, 1991, now Pat. No. 5,441,360, which is a continuation-in-part of application No. 07/284,744, filed on Dec. 9, 1988, now abandoned, which is a continuation-in-part of application No. 07/149,686, filed on Jan. 28, 1988.

(51) Int. Cl.$^7$ .................................................. C09D 195/00
(52) U.S. Cl. ...................... 106/284.05; 106/13; 106/277; 106/472; 404/17
(58) Field of Search .......................... 106/13, 277, 281.1, 106/284.05, 472; 404/17

(56) References Cited

U.S. PATENT DOCUMENTS

| | | | |
|---|---|---|---|
| 3,964,183 | 6/1976 | Mouat | 37/12 |
| 4,008,095 | * 2/1977 | Fukushima et al. | 106/235 |
| 4,032,355 | 6/1977 | McLaughlin et al. | 106/273 N |
| 4,069,181 | 1/1978 | Healy et al. | 260/28.5 |
| 4,094,697 | 6/1978 | Rostler | 106/280 |
| 4,190,757 | 2/1980 | Turpin et al. | 219/10.55 |
| 4,196,013 | 4/1980 | Dannenberg et al. | 106/281 R |
| 4,252,459 | 2/1981 | Jeppson | 404/77 |
| 4,252,487 | 2/1981 | Jeppson | 404/77 |
| 4,266,108 | 5/1981 | Anderson et al. | 219/10.55 |
| 4,276,093 | 6/1981 | Pickermann | 106/281 R |
| 4,282,039 | 8/1981 | Bullough | 106/278 |
| 4,319,856 | 3/1982 | Jeppson | 404/79 |
| 4,370,534 | 1/1983 | Brandon | 219/10.55 |
| 4,571,860 | * 2/1986 | Long | 37/197 |
| 4,594,022 | 6/1986 | Jeppson | 404/77 |
| 4,744,693 | 5/1988 | Smith | 404/77 |
| 4,849,020 | 7/1989 | Osborne et al. | 106/281.1 |
| 5,092,706 | 3/1992 | Bowen et al. | 404/77 |
| 5,441,360 | * 8/1995 | Long | 404/77 |

FOREIGN PATENT DOCUMENTS 2453151  5/1976  (DE).

OTHER PUBLICATIONS

Chemical Dictionary—By Grant HackH—Fifth Edition McGraw Hill Book Co. Merriam–Webster Dictionary—copyright(1986) p. 90 (No date provided) (No month avail).
Grant et al. (editors),*Grant & Hackh's Chemical Dictionary,* New York, McGraw–Hill Book Company, 5th edition, pp. 43, 90 (1986) (no month avail.) (referred to as Grant).*

* cited by examiner

*Primary Examiner*—David Brunsman
(74) *Attorney, Agent, or Firm*—Roy E Mattern, Jr.

(57) ABSTRACT

Asphaltic concrete compounds comprised of asphalt cement and aggregate have, as a substantial portion of their respective aggregates, anthracite coal particles and fines, which are added specially as a lossy microwave material. These asphaltic concrete compounds are particularly useful when laid down as a pavement, or a top layer of a pavement, which thereafter can be freed of ice, by using microwave energy to debond the ice. The debonding of the ice occurs without causing any noticeable melting of the ice, and the debonded ice is thereafter easily lifted and removed from the pavement of the way, serving as a roadway, highway, runway, or walkway. Also these asphaltic concrete compounds are particularly useful as patching materials when damaged pavement is being repaired, especially during cold weather. They are used to coat the damaged pavement portions, creating a coating, to thereafter receive microwave energy, which results in the penetration of heat into both the coating and the portions of the damaged pavement. This heat insures their bond, and also the bond of the asphaltic concrete compound, which is filled into the damaged pavement cavities. Also the top layer and/or the entire filled cavities of the originally damaged pavement, include this asphaltic concrete compound, which has the anthracite coal, added as the lossy microwave material, to thereby facilitate the penetration of heat, which in turn insures the creation of strong bonds throughout the repaired pavement.

8 Claims, No Drawings

ND USES
ASPHALTIC COMPOSITIONS AND USES THEREFOR

CROSS REFERENCES

This application is a Divisional Application of the second continuation in part application Ser. No. 07/655,675, filed Feb. 14, 1991 now U.S. Pat. No. 5,441,360. The first, then, continuation in part application was Ser. No. 07/284,744, filed Dec. 9, 1998 now abandoned. The original, then application, was Ser. No. 07/149,686, filed Jan. 28, 1988. Howard w. Long is the inventor in respect to all four applications, which all have the same title. He passed away on Jul. 31, 1990, and his wife, Genevieve E. Long, filed the second continuation in part application, and she is filing this Divisional Application, which is necessitated by a previous Restriction requirement. The priority remains of the preceding three applications. The information in these prior applications and in the files thereof is incorporated into this application and the file thereof.

BACKGROUND OF INVENTION

When the teachings of this invention are followed, my prior invention becomes economical and practical in respect to debonding, lifting, and removing ice from ways, i.e. walkways, roadways, highways, and runways. My prior invention is illustrated and described in my U.S. Pat. No. 4,571,860, issued on Feb. 25, 1986 entitled Method and Apparatus for Removing Ice From Paved Surfaces.

The easy debonding, lifting, and removing of ice, originally tightly bonded to ways or pavements, as described in my patent, occurs when a vehicle is used, having, in an arrangement of selected special components from front to back, of a snow removal blade, a microwave energy emitting device and an ice scraper. In operation, as the vehicle passes over ice coated pavement, the snow is removed from the ice, microwave energy is directed, nearly transparently, through the ice to the pavement below the ice, creating heat to raise the temperature of the top surface of the pavement and thereby debond the ice. Then the ice is lifted and removed by the ice scraper from the pavement, as the debonded ice is easily lifted off of the surface of the pavement.

In my patent I then discussed two different types of pavements from which the ice could be debonded and then easily lifted and removed. One pavement is a portland cement concrete pavement topped by a protective reflective layer adhered to the concrete. Then a heat insulating material is adhered to this reflective layer. Thereafter a graphite containing epoxy top layer, is adhered to the heat insulating material. The other pavement was an asphaltic concrete or other type of an asphalt type pavement.

Although the objectives of this ice removal method and apparatus were reachable, there was a need to provide a better pavement at a comparatively lower cost to effectively and efficiently use the microwave energy to generate the heat to in turn debond the ice. During the time of determining this better pavement, and also during the considerations of these patent applications, information in many patents and publications has been reviewed. Some of this information considered pertinent is referred to as follows.

Mr. Jeppson in his U.S. Pat. No. 4,175,885 described his use of microwave energy to heat old asphaltic concrete pavement to restore it by raising the temperature so the asphalt cement would become liquid or semi-liquid.

Mr. Rostler in his U.S. Pat. No. 4,094,697 described his use of carbon black, in a range of seventy to one hundred parts by weight, in asphalt cement to increase the abrasion resistance of asphalt cement.

Messrs. Fukushima, Nozaki, Tanaka, and Kanegawa in their U.S. Pat. No. 4,008,095 described their addition of microgranular coal to asphalt to create a better paving composition.

Mr. Pickermann in his U.S. Pat. No. 4,276,093 described his asphalt production equipment utilizing microwave heaters.

Messrs. Boyko, Lederer and Sawyer reported, in March 1976, their use of a truck having microwave power generating equipment utilized during the patching of roadways. They described the use of their equipment for thawing and deicing applications. They said microwave energy will penetrate a sheet of ice on the surface of the concrete, with practically no loss. Then the microwave energy encounters the very highly absorbing material of water in the concrete, where it will be absorbed and dissipated in the form of heat. The temperature differential at the boundary of the ice and water saturated concrete causes separation of the ice from the concrete, and the ice can then be scraped and removed by conventional means.

Messrs. McLaughlin and Sayigh in their U.S. Pat. No. 4,032,355 described their bituminous composition for roadways, which they developed for use in hot climates.

Messrs, Dannenberg and Williams in their U.S. Pat. No. 4,196,013 described their oxidation resistant asphalt compositions. They dispersed in petroleum asphalt, oil furnace carbon black to improve the resistance of their newly formulated asphalt composition to thermal or actinic oxidation.

Mr. Brandon in his U.S. Pat. No. 4,370,534 described his use of microwave energy to heat, thaw, and/or demoisturize materials and/or objects.

Mr. Mouat in his U.S. Pat. No. 3,964,183 described his method and apparatus used for detaching coatings frozen on to surfaces, including paved roadways and runways. He provided equipment which directed a concentrated intense beam of visible light on to the interface between the coating and the surface to raise the temperature of the interfacial zone to the melting point, to free the coating from the surface.

In a West German patent 2,453,151, a method is described to decompose layers of ice from roads and rails by exposing the ice to electromagnetic waves of discrete narrow frequency bands. Then a mechanical device removed the ice.

Messrs. Osborne and Hutcheson in their U.S. Pat. No. 4,849,020 described their improved asphalt composite, which included a mixture of asphalt and a lossy microwave adsorptive material. By including this lossy microwave adsorptive material, they enhanced the removal, reconditioning, and reforming, of their improved asphalt composite, during patching or repair operations, which relied upon microwave radiation heating. Ferromagnetic material was the lossy microwave material, which was homogeneously mixed with the asphalt material. They listed four basic groups of substances used as lossy microwave material. The first group comprises semi-conductors such as zinc oxide. The second group comprises ferromagnetic materials. The third group comprises oxides of metal. The fourth group comprises dielectric materials, such as asbestos, carbon and graphite.

SUMMARY OF THE INVENTION

This invention pertains to the compositions of both an asphaltic concrete pavement and asphaltic patching compounds, which when applied and used are exceptionally lossy to microwave energy thus making available the very rapid temperature rise required to debond ice from such pavement and patches in a practical manner. The pavements and patches have a high microwave energy absorbency, and are durable, strong, hard, stable, tough, corrosion resistant, and abrasion resistant. Also these pavements and patches have a low volatility, and a high coefficient of traction when either wet or dry. Also they are derived from low cost and ready availability materials. In these compositions anthracite coal is substituted for a substantial part of the aggregate which is combined with asphalt cement to make up asphaltic concrete pavement or asphaltic patching compounds. Preferably in the compositions of asphaltic concrete pavement, the anthracite coal is included within the range of ten to thirty percent by weight. Preferably in the compositions of asphaltic patching compounds, the anthracite coal is included within the range of ten to forty percent by weight.

DESCRIPTION OF THE PREFERRED EMBODIMENTS

Anthracite Coal, as a Lossy Microwave Absorbent Material, is Included as a Substantial Portion of the Aggregate of an Asphaltic Concrete Compound Serving as the Top Surface and Surface Support Portions Thereof of a Way to Efficiently Intercept Microwave Energy During Ice Removal Operations As set forth previously in the Background of this invention, in referring to my U.S. Pat. No. 4,571,860, in order to effectively and conveniently remove ice initially tightly bonded to ways and pavements using a vehicle, specially equipped, it is necessary to quickly raise the temperature of the surface of the pavement at the interface with the ice bonded to it, to a temperature high enough, that transmission of heat from the warmed pavement to the ice, will quickly raise the temperature of the ice at the interface sufficiently to debond the ice. Thereafter mechanical lifting, separating, and removing of the debonded ice from the pavement is readily undertaken.

It has been known and observed that the strength of ice varies inversely with its temperature. For instance it has been stated that the bond strength of ice to portland cement concrete at −60 degrees F. is about 60,000 pounds per square inch, but is much weaker as its temperature approaches 32 degrees F. Because of this it is not necessary to raise the temperature of the ice is at the interface to above 32 degrees F. in order to debond it mechanically. Tests to determine the time required for debonding ice from samples of pavement by microwave energy have been run in a microwave oven and in a microwave laboratory. Because the microwave energy level and focus in static tests differ greatly from that with the use of larger magnetrons in specially designed wave guides directed at the ice bonded pavement, the times determined in these tests are indicative only. In commercial units the speed of the debonding and ice removal will be controllably variable by adjusting magnetron power levels and the number and spacing of wave guides in the matrix. In early tests a small section of pavement, arranged as a Marshall test specimen, a cylinder 4 inches in diameter and 2½ inches in height was given a 2 inch depth coating of water. The water was frozen to below 0 degrees F. A halter anchored in the ice was suspended in a microwave beam and the time required to debond the ice and let the Marshall cylinder drop free was recorded. It was interesting to note that immediately after each such test, the previously adjoined surfaces of ice and pavement were dry. Although this could have been partially caused by sublimation of the moisture, the dry surfaces are indicative of the fact that little or no ice is melted in this process. In these tests I found that asphaltic concrete according to my improved compound is released from the ice coating several times faster than conventional asphaltic concrete pavement sections are likewise released.

In my improved asphaltic concrete compound, anthracite coat, as a lossy microwave absorbent material, is included as a substantial proportion of the aggregate to considerably increase the microwave absorbency of the pavement, without appreciably raising its cost or adversely affecting the quality of the pavement made therefrom as determined by official laboratory tests.

Since proportions of asphalt cement and aggregates of varying sieve size in asphaltic concrete compounds vary greatly according to the aggregates used and the experience of those responsible for paving, it is not practical to specify the proportions of anthracite coal used in relation to other aggregates. However, I have found that in the preferred form of my invention, the improved asphaltic concrete compound for use as a pavement, conducive to rapid ice removal by microwave energy, includes in place of much or all of the sand size aggregate, anthracite coal in sieve sizes which are a mixture of rice, i.e. buckwheat number 2, and smaller sizes, including silt, to compose an appreciable proportion by weight, i.e. 20 percent to 25 percent by weight, in the preferred embodiment, of the asphaltic concrete compound. Preferably in respect to pavement, the anthracite is included in a range of ten percent to thirty percent by weight.

When my improved asphaltic concrete compound is laid down and compacted as a dense mix pavement, the asphalt cement coated small particles of anthracite are forced into the spaces between the larger pieces of aggregate and thus compose most of the top surface of the compacted pavement. Thus when the microwave energy is directed through the ice at the pavement, the small anthracite particles are penetrated by the microwaves and become hot throughout, while not much more than the outer surfaces of the larger aggregate pieces are heated at first. The pavement top surface, being composed of asphalt cement coated small particles of anthracite, becomes hot rapidly, conducting heat to the interface of the ice as desired.

An advantage of laying a completely new pavement composed of my improved anthracite enriched asphaltic concrete throughout its entire thickness is that, when and if such a pavement is later recycled, it still contains the anthracite and thus will be microwave absorbent as before. Also more anthracite can be conveniently added. However, it is possible to reduce the cost of obtaining a microwave absorbent pavement by adding a course or courses of my improved anthracite enriched asphaltic concrete to an existing pavement. Such added course or courses can be a compound with emulsified asphalt. Emulsified asphalt compounds made of asphalt cement with small amounts of emulsifying agent and water are often used with aggregate for the whole range of pavement systems from light duty to heavy duty and can be a top course only, a base course only, a base course or a base course and top course. If it is a hot mix, most or all of the water evaporates, and any remaining water will drain through to a drainage field. If it is a cold mix, the water will likewise drain through. Thus the remaining pavement is asphaltic concrete composed of asphalt cement and aggregates.

I have found the anthracite coal is a very uniquely beneficial lossy microwave absorbent material for the many following reasons:

1. Anthracite coal when washed and dried has 92 percent or more fixed carbon and is therefore highly absorbent of microwave energy;

2. Anthracite coal has only a moisture content of about 2 percent and is non-hydrophilic, and therefore is physically stable with a high resistance to variations of weather;
3. Anthracite coal is also very stable physically because it does not readily break down and crumble as is the case with many other microwave absorbent materials;
4. Selected anthracite has only about 5 percent or less volatile matter and therefore will not adversely cause bubbles in the pavement in which it is incorporated nor dilute nor dissolve the asphalt cement;
5. Anthracite has a very high ignition temperature in air of 925 degrees F and thus remains stable at high temperatures;
6. Anthracite is very hard and because of this it is relatively difficult to grind and has a high abrasion resistance, and in respect to its history, at mines, small sizes of anthracite have been rejected because they were hard to burn, and when used as road material for mine haul roads, after up to 100 years of use by heavy trucks on haul roads, the road material is still bright and shiny as new with little evidence of decomposition;
7. Anthracite coal, being 92 percent or more carbon, has the low coefficient of thermal expansion of carbon;
8. Anthracite coal is available in large quantities in the desired sieve sizes; the cost at site is acceptable; rail and highway transportation is at hand and ocean transportation is practical; very little processing is required, but quality control is necessary to make this product suitable for the stated purpose; washing and/or a flotation process may be necessary to separate out any loose extraneous material such as clay, shale, etc.; and as with all aggregates, sizing by screen is required to obtain the sizes needed; clean fragments of anthracite are preferable for the best bonding with asphalt cement and gaining the strength of the finished pavement; thus the overall cost of this material should always be low; and
9. The small fragments of anthracite coal to be used are naturally sharp and irregular and therefore serve to tightly bind the asphaltic concrete together.

Anthracite Coal as a Lossy Microwave Absorbent Material is Included as a Substantial Portion of the Then Anthracite Enriched Asphaltic Compound, Which When Heated is Swabbable and/or Sprayable Onto All Damages Surfaces of a Way, to Thereafter Efficiently Intercept Microwave Energy During the Repairing of Potholes in a Way A serious problem experienced in patching potholes and cracks in pavement is the difficulty in obtaining a strong bond between the damaged pavement and the patch material. A strong bond is particularly difficult to obtain when the damaged pavement is cold and/or damp. My improved anthracite enriched asphaltic concrete compound can be used to obtain the strong bond between patch material and damaged pavement required for a durable lasting repair.

The first step in repairing a pothole using my improved compound is to clean the pothole by air jet or mechanical means, then to swab or spray an anthracite enriched asphaltic concrete compound preheated to a fluidic state onto all of the damaged surfaces of the pavement, thoroughly coating them. Preferably this compound is made up as an asphalt emulsion and heated to about 150 degrees C. The anthracite is included in the preferred range of ten to forty percent by weight.

The second step is to direct microwave energy at the coated surfaces of the pothole for enough time to warm the damaged pavement to a minimum depth of ½ inch so that as additional coatings of hot patch material are added to fill the pothole, the warm pavement under the exposed surface of the damaged area will insure a strong bond between patch material and the damaged pavement. It will be appreciated that since the first coating, preferably derived as an emulsion, which is sprayed or swabbed onto the damaged surfaces of the pavement in the pothole, is rich in microwave absorbent anthracite lossy material, the microwave energy directed at it keeps it hot to prevent heat loss from the underlying damaged pavement as it absorbs energy from the microwaves. Thus the sprayed or swabbed first coat, serving as the bonding coat, and the pavement which it covers are heated together, thereby insuring a strong bond. This method of bonding patching material to the damaged surfaces of the pavement is not only applicable to asphaltic concrete but to portland cement concrete as well. The disadvantages of prior practices wherein the damaged surfaces are heated by flame, thus wetting and possibly adding soot resulting in poor bonding, are eliminated.

The additional patching material is preferably of similar composition as the first coat of anthracite enriched asphaltic concrete, and it also can have anthracite included in the preferred range of ten to forty percent by weight. The fluidic condition of the spraying or swabbing material as an emulsion allows its use in repairing cracked pavement. The subsequent application of microwave energy to the crack, so filled, facilitates a sound bond of this material or compound to the sides of the crack. Anthracite fines, and other proportions thereof may be in some applications be included beyond the 40 percent by weight of the selected patching compound.

Comments Regarding Emulsified Asphalt

In respect to the top pavement layer and in respect to the first layer spread about a crack or pothole, emulsified asphalt is electively used. In respect to asphalt pavement construction, the terms emulsified and asphalt mean: an emulsion of asphalt cement and water that contains a small amount of an emulsifying agent, a heterogeneous system containing two normally immiscible phases, asphalt and water, in which the water forms the continuous phase of the emulsion, and minute globules of asphalt form the discontinuous phase. Emulsified asphalt may be of either the anionic, electronegatively charged asphalt globules, or cationic, the electropositively charged asphalt globule types, depending upon the emulsifying agent; and the terms emulsified asphalt mix, also referred to as cold mix, mean: a mixture of emulsified asphalt and aggregate, which is produced in a central plant and then referred to as a plant mix, or which is produced or mixed at the road site, and then referred to as mixed in place.

Regarding the Remaining Percentage Distribution of Other Components of These Asphaltic Compounds Previously in respect to the quantities of anthracite added as the lossy microwave absorbent material, the range of ten to thirty percent was given, when top pavement layers were discussed, and the range of ten to forty percent was given, when crack, pothole, or cavity repairs were discussed.

These ranges are preferred, and considered economical and practical. However, the amount, or percentage, by weight, selected of the anthracite that is to be included as the lossy microwave absorbent material, is to be always determined and included in a quantity that will efficiently intercept the microwave energy during a selected ice removal process, utilizing respective specific embodiments of special equipment mounted on vehicles, when ice is being debonded, lifted, and moved away from the pavement.

Likewise, the amount, or percentage, by weight of the anthracite in the patch compound or material will be selected in reference to the process and equipment used in repairing pavements and ways.

In reference to what the remaining percentage distribution of the other components of these asphaltic compounds might be, the present industry formulations and practices are followed. these practices vary depending on the factors of: the pavement and patch locations; the weights and volumes of traffic; and the geographical areas. These factors are always of concern to those responsible for providing paved ways for vehicles and pedestrians.

I claim:

1. An asphaltic concrete compound for either as a top layer of paving, or at least the first bottom layer of a pavement patch and then the top layer of a pavement patch, to efficiently intercept microwave energy whenever directed downwardly to the top layer of paving, or to the first bottom layer of a pavement patch and then to the top layer of a pavement patch, to generate heat in these respective layers, so the generated heat will be efficiently conducted essentially to the surface of these top layers, to debond ice which had previously bonded to the surface of these layers, for the purpose of readily removing the debonded ice from paving, and in respect to pavement patches, when necessary, readily removing the debonded ice, while also heating the surfaces of the pavement hole to aid in the bonding of the asphaltic concrete compound used in filling the pavement hole, comprising:

aggregate, comprising gravel, rocks, and the added lossy microwave anthracite material; and asphalt cement surrounding the aggregate;

whereby, the added lossy microwave anthracite material is included in a quantity large enough to efficiently intercept microwave energy, which is directed downwardly to the surfaces of this asphaltic concrete compound.

2. An asphaltic concrete compound, as claimed in claim 1, having the added lossy microwave anthracite material, included in the range of ten to forty percent by weight of the total weight of the asphaltic concrete compound.

3. An asphaltic concrete compound, as claimed in claim 2, wherein the asphaltic concrete compound having the added lossy microwave anthracite material, is itself prepared as an emulsion.

4. An asphaltic concrete compound, as claimed in claim 1, having the added lossy microwave anthracite material, included within the range of ten to thirty percent by weight of the total weight of the asphaltic concrete compound.

5. An asphaltic concrete compound, as claimed in claim 4, wherein the asphaltic concrete compound having the added lossy microwave anthracite material, is itself prepared as an emulsion.

6. An asphaltic concrete coating compound comprising:

aggregate, comprising gravel, rocks and added lossy microwave anthracite material; and asphalt cement surrounding the aggregate and forming a resulting coating adopted for distribution on irregular remaining surfaces of failed remaining portions of ways having cracks and potholes in these ways, such as vehicle ways, highways, runways, and walkways, whereby the anthracite, as the added lossy microwave anthracite material in this coating compound, in efficiently intercepting microwave energy to generate heat in this asphaltic concrete coating compound, conducts this generated heat to these irregular remaining surfaces to also insure a good bond to an asphaltic concrete compound filled into these potholes and cracks during repairs of these ways.

7. An asphaltic concrete coating compound, as claimed in claim 6, having the added lossy microwave anthracite material, included within the range of ten percent to forty percent by weight of the total weight of the asphaltic concrete coating compound.

8. An asphaltic concrete coating compound, as claimed in claim 7, wherein the asphaltic concrete coating compound having the added lossy anthracite microwave material is itself prepared as an emulsion.

* * * * *